United States Patent [19]

Boyd et al.

[11] 4,444,260

[45] Apr. 24, 1984

[54] OIL SOLVATION PROCESS FOR THE TREATMENT OF OIL CONTAMINATED SAND

[75] Inventors: Phil A. Boyd; James E. Stolhand, both of Ponca City, Okla.

[73] Assignee: Conoco Inc., Ponca City, Okla.

[21] Appl. No.: 293,554

[22] Filed: Aug. 17, 1981

[51] Int. Cl.$^3$ .............................................. E21B 43/40
[52] U.S. Cl. ................................... 166/267; 166/310; 166/371
[58] Field of Search ............... 166/265, 266, 267, 279, 166/310, 312, 371; 134/25.1, 40; 208/87, 11 LE; 299/7, 17

[56] References Cited

U.S. PATENT DOCUMENTS

| | | | |
|---|---|---|---|
| 894,590 | 7/1908 | Brown | 166/267 X |
| 1,531,173 | 3/1925 | Brady | 166/310 |
| 2,009,366 | 7/1935 | Wait | 208/11 LE |
| 2,340,481 | 2/1944 | LLoyd | 166/312 X |
| 2,765,850 | 10/1956 | Allen | 166/267 |
| 2,825,677 | 3/1958 | Coulson | 208/11 LE |
| 2,885,339 | 5/1959 | Coulson et al. | 208/11 LE |
| 3,017,342 | 1/1962 | Bulat et al. | 134/25.1 X |
| 3,041,267 | 6/1962 | Frame et al. | 208/11 LE |
| 3,057,404 | 10/1962 | Bergstrom | 166/267 |
| 3,516,490 | 6/1970 | Smalling et al. | 166/267 X |
| 3,547,803 | 12/1970 | Barkman, Jr. et al. | 208/11 LE |
| 3,884,829 | 5/1975 | Moyer | 208/11 LE X |
| 3,945,435 | 3/1976 | Barry | 166/267 |
| 4,017,377 | 4/1977 | Fairbanks, Jr. et al. | 208/11 LE |
| 4,206,001 | 6/1980 | Knowlton et al. | 134/40 X |
| 4,308,136 | 12/1981 | Warne, Jr. | 210/114 |

*Primary Examiner*—George A. Suchfield
*Attorney, Agent, or Firm*—A. Joe Reinert

[57] ABSTRACT

A method for the treatment of oil well production streams to process oil-contaminated sand to recover oil therefrom and produce an ecologically acceptable clean sand residue. The process involves separating the production fluid from an oil well having sand entrained therein into a plurality of components, one of which comprises an oil-contaminated sand. The contaminated sand is contacted with a light oil solvent to initiate a solvating action of the oil contaminant. The resulting mixture of oil-contaminated sand and solvent is then contacted with water and the system then gravity separated into discrete sand, water and oil phases. The oil and water phases may be removed from the sand and the sand phase again contacted with water and the resulting mixture then subjected to gravity separation to produce separate sand and water phases. The water phase is then removed and the sand passed to a suitable disposal facility.

11 Claims, No Drawings

OIL SOLVATION PROCESS FOR THE TREATMENT OF OIL CONTAMINATED SAND

DESCRIPTION

1. Technical Field

This invention relates to the treatment of oil well production streams and more particularly to the treatment of oil contaminated sand to recover oil therefrom and produce a clean sand residue available for disposition without an adverse environmental impact.

2. Background of Invention

In the petroleum industry many oil producing formations are encountered which are only partially consolidated so that detrital formation material enters the well along with the reservoir fluids. Such detrital material is commonly referred to as "sand", although it may take the form of other types of rock particles originating in a sandstone or other sedimentary rock formation. For example, the "sand" entering the well may actually take the form of clay, silt, or limestone particles.

The sand entering the well is produced to the surface, either directly or indirectly, in any one or more of several ways depending upon the mode of operating the well, the sand characteristics, and the rheology and flow characteristics of the reservoir fluids in the well. For example, the sand as it enters the well may be retained in suspension in a relatively viscous crude oil which is forced to the surface by pumping means such as a sucker rod pumping system. The sand also may be retained in suspension in a relatively high gravity, low viscosity oil which flows upwardly through the well under a relatively high pressure gradient, such as in the case of a flowing well.

Other techniques by which sand is produced to the surface of the well include the application of various corrective procedures employed to remove accumulated sand from the well or to prevent sand accumulation in the well. For example, where unacceptable quantities of sand have accumulated in the bottom of a well, oil may be circulated down the tubing and back to the surface through the tubing-casing annulus. The oil is injected under sufficient pressure to "wash" the sand from the bottom of the well and entrain it in the fluid as it is returned to the surface. Another technique involves the use of circulating oil which is introduced into the well during the normal pumping operation. For example, where the normal oil flow within the well is inadequate to retain the produced sand in suspension, an oil may be introduced down the well through the tubing-casing annulus. The oil flows past the producing horizon and is returned to the surface through the tubing and provides an additional vehicle for keeping the sand in suspension, thus enabling its removal to the surface of the well. Such procedures for handling sand in oil producing wells are well known to those skilled in the art and for a further description thereof, reference may be had to Uren, L. C., Petroleum Production Engineering—Oil Field Exploitation, McGraw-Hill Book Co., Inc., New York, Toronto and London (1953), pp 405–409.

At the surface installation associated with the well, the production stream is treated to remove sand, water, and any other contaminants from the crude oil. Disposal of the sand and other contaminant products must be undertaken with a sensitivity to environmental considerations. For example, the oil contaminated sand must be handled in a manner to avoid pollution of the surroundings such as farm lands or ground waters which may enter into fresh water systems.

DISCLOSURE OF THE INVENTION

In accordance with the present invention there is provided a new and improved process for the treatment of an oil well production stream to recover oil and a more ecologically acceptable "clean" sand from an oil-contaminated sand. In carrying out the invention, the production fluid from the well having sand entrained therein is separated into a plurality of components, one of which comprises an oil-contaminated sand. The oil-contaminated sand is contacted with a light oil solvent to initiate a solvating action of the oil contaminant. The solvent, oil-contaminated sand mixture is then washed with water. This mixture is then subjected to a gravity separation procedure to separate the system into discrete sand, water, and oil phases. The sand may then be disposed of by any suitable technique and the oil phase recovered and sent to the pipe line.

In a further embodiment of the invention, prior to disposal of the sand, the oil and water phases are removed from the sand and the sand is again washed with water. After agitation for a suitable period of time, the resulting sand-water mixture is subjected to gravity separation to produce separate sand and water phases. The water phase is then removed and the sand recovered for ultimate disposal. In yet a further aspect of the invention, a light oil solvent is circulated down the well where it is mixed with the crude oil. The resulting crude oil mixture which is produced from the well has a higher gravity than the original formation oil, thus facilitating the decontamination of the waste sand ultimately recovered at the surface.

BEST MODES FOR CARRYING OUT THE INVENTION

In the field processing associated with the production of crude oil various steps are taken to effect the separation of gas and oil and the purification of the oil fraction by dehydration and such other steps as may be necessary. Typically the produced fluid is passed from the well head to a suitable gas-oil separator where gas is separated out from the production stream in one or more stages. From there, the production stream is passed to a dehydration unit. Most dehydration units take the form of heater treaters although other dehydration means such as electrical dehydrators or chemical treating units can be employed. Where the oil contains large quantities of water which is not fixed in a strong emulsion, the production stream may be passed through a free water knock-out prior to application to the heater treater or other dehydrator or, in some cases, prior to application to the oil-gas separator.

Oil-contaminated sand may be recovered from the production stream at one or more of the various separation stages employed in the surface processing facility. For example, where a heater treater is employed to break oil and water emulsions, there usually will be relatively large quantities of sand which are recovered periodically from the bottom of the heater treater vessel. Sand may also be recovered from the oil and gas separator and from the free water knock-out, although sometimes in smaller quantities. Where the produced oil contains unusually large quantities of sand it also may be expedient to employ a sand trap or knock-out at some point in the surface processing facility. Sand separators thus employed may be of any suitable type and may take the form of filtration or screen type separators or gravity separators such as jet desanders, cyclone type separators, or simple settling vessels.

Regardless of the technique or techniques employed to separate sand from the production stream, the sand is contaminated with oil. The extent of oil contamination and the ease with which it may be overcome depend upon the crude oil characteristics and the sand characteristics. For example, the grain size of the sand has a marked impact upon the palliative steps taken to reduce oil contamination. In general, the fine sands present more surface area for oil adherence than do the relatively coarse sands; thus, the finer the sand grain size, the more difficult the task of oil removal. Accordingly, in many cases in the past, it has been considered to be financially infeasible to recover oil from fine sand masses, and steps have been taken to attempt to dispose of the oil-contaminated sand without treatment. This is often times difficult to accomplish in an environmentally acceptable manner.

The characteristics of the crude oil may also have a significant impact upon the degree of oil contamination of the waste sand and also upon the ease of removal of the contaminating oil from the sand. In general the low API gravity oils of relatively high viscosity form contaminant systems with the sand which are less susceptible to treatment than the higher API gravity, relatively low viscosity oils.

In accordance with the present invention, effective cleansing of such oil-contaminated sand is accomplished by solvation of the oil on the sand by action of a light oil solvent followed by the introduction of water under circumstances to enable the formation of separate oil and water layers by gravity segregation. The oil-contaminated sand is separated from the production stream recovered from the well at any suitable point or points in the surface processing facility, as described earlier. The contaminated sand is then contacted with the light oil solvent, which may be of any suitable type. For example, the solvent may take the form of refined petroleum fractions ranging from petroleum ethers and naphthas up through the kerosene and gas-oil fractions or it may be a relatively high API gravity, low viscosity crude oil. Other suitable solvents include refined hydrocarbon solvents such as the low to intermediate molecular weight alkanes, e.g. butane, hexane, decane, etc., or aromatic solvents such as benzene, toluene, or xylene. As described in greater detail hereinafter, it will be preferred to use an unrefined oil and to use the same oil for recirculation down the production well. The oil solvent and oil-contaminated sand are mixed together by any suitable technique. Preferably the contact of the sand with the light oil solvent is accompanied by or followed by mild agitation provided by mechanical means such as by stirring. The solvent and the oil-contaminated sand are mixed together in any desired proportions. Usually it will be desirable to add the oil solvent in an amount to provide a volume ratio of solvent to oil-contaminated sand within the range of 0.5-1.

After the solvent is added, the resulting mixture is contacted with water. It is preferred here, as in the case of the solvent addition step, to accompany or follow the water addition step with mild agitation, such as provided by mechanical stirring. It is preferred to employ the water in an amount to provide a volume ratio of water to oil-contaminated sand (as originally present prior to the addition of the solvent), within the range of 1 to 2. The water may be heated or unheated, but it is preferred to employ water which is at least moderately heated to a temperature of at least 40° C. However, the invention may be carried out effectively with cooler water.

After the addition of the water with the accompanying agitation, the mixture is then separated by gravity into discrete sand, water and oil components. Any suitable technique can be employed to accomplish the gravity separation step, but it usually will be satisfactory to simply allow the system to remain quiescent for a period of an hour or more, during which time the phase separation occurs.

At this stage, the sand may be withdrawn from the separation vessel and transferred to the disposal facility. However, it is preferred to withdraw the oil and water layers from the separation vessel and repeat the water addition step. Thus water may again be added to the sand and the resulting mixture agitated, usually for a shorter period of time than that involved in the initial water addition step. The resulting mixture is then allowed to separate by gravity segregation as described previously. For example, where the separation step is accomplished by settling, the system may be allowed to remain quiescent for a somewhat shorter period than involved in the initial separation step. This step may or may not result in the formation of separate oil and water phases. Usually only a very small amount of oil will be present at this time and the liquid phase is simply withdrawn as water and applied to the water disposal system. The sand is then recovered and passed to the sand disposal facility.

A preferred application of the present invention is with respect to wells which are treated with a circulating oil. In this regard it is a conventional practice in the production of low-gravity crude oils to circulate a high gravity oil, commonly termed a "blend oil", down the tubing casing annulus of the well. The function of the blend oil is to produce a downhole mixture of a somewhat higher gravity than the original formation oil, thus facilitating the production of the crude oil to the surface. In this application of the invention, the use of the blend oil not only facilitates the production of the oil from the well, but also makes the oil-contaminated sand ultimately recovered at the surface more susceptible to cleansing in accordance with the invention.

The invention may be carried out employing a batch treatment or a continuous flow process. An example of a batch process may be described with reference to a production system in which the production stream from one or more wells is applied through a suitable header to a free water knock-out in which the production stream is grossly separated into oil and water phases with oil-contaminated sand settling to the bottom of the knock-out. The water output from the free water knock-out is circulated to a suitable disposal zone such as a water injection well. The oil phase is withdrawn from the free water knock-out and applied to a suitable gas-oil separator and then to a heater treater where de-emulsification and dehydration of the oil occurs. Additional oil-contaminated sand also settles out to the bottom of the heater treater. The formation oil is a heavy viscous oil having a gravity about 10°-12° API and a viscosity at 100° F. (38° C.) of 5281 centistokes and of 150° F. (66° C.) of 521 centistokes. A high gravity, unrefined crude oil (38°-42° API) is employed as a blend oil and circulated down the production wells such that the produced oil stream has a gravity of about 20°-24° API at 180°-190° F. (82°-88° C.). The batch treatment of the contaminated sand recovered from the free water knock-out and the heater treater is carried out in a vertical vessel having a capacity of 100 barrels and equipped with a mechanical stirrer and having drain ports located at intervals of about 1 foot along the length of the tank. The unrefined oil used as blend oil is also employed as the solvent in the process and about 10-20 barrels of this light oil are added to the treatment vessel. The stirrer is activated to provide mild agitation and about 20 barrels of oil-contaminated sand from the bottom of the heater treater and the free water knock-out are also added to the vessel. After adding the sand to the solvent approximately 20-40 barrels of warm water recovered from the heater treater are added to the vessel.

The action of the agitator is continued during the addition of the water and for about 10 minutes after the water step is completed. The stirrer is then stopped and the mixture allowed to settle for a period of 10 minutes up to several hours. The upper oil layer is then removed through the appropriate drain ports and the oil thus recovered is directed back to the heater treater. The water layer is bled off and directed to the free water knock-out for ultimate disposal to the water injection wells. Thereafter additional warm water in the amount of 20 barrels is added to the vessel. Agitation is continued for a period of several minutes and the resulting system then allowed to stand to let the sand settle out of the suspension. After about 15 to 30 minutes, the water layer is bled off and directed to the free water knock-out unit and clean sand is removed from the bottom of the reaction vessel and passed to the disposal area.

As noted previously any suitable light oil solvent, either refined or unrefined, may be employed in solvation of the oil contaminant from the sand. Preferably an unrefined oil is used for this purpose and also as the circulating oil in the application of the invention described above. It is preferred to employ a de-emulsifying agent in the oil solvent in order to facilitate the separation of the oil and water into separate phases during the subsequent gravity separation step. The de-emulsifiers may be nonionic or anionic in character as will be understood by those skilled in the art. Suitable emulsion breakers include polyethoxylated alkyl phenols and alkylaryl sulfonates in the form of the alkali metal or ammonium salts. It is also desirable to use a de-emulsifier in the circulating oil injected down hole.

The invention is particularly useful in the decontamination of fine sands which, as noted previously, provide large surface areas for adherence of the contaminating oil. Thus a preferred application of the present invention is in the decontamination of sands where the predominant sand components, i.e., at least 50 weight percent are finer than 65 mesh (Tyler Standard screen scale).

The efficacy of the present invention can be demonstrated with reference to experimental work carried out on a fine sand contaminated with a low gravity crude oil. In a number of tests, the oil-contaminated sand system comprised 25 to 30% oil by weight. The oil was a crude oil having a gravity of about 16° API. The sand was extremely fine with well over two-thirds of it passing through a 65 mesh screen. A more specific breakdown of the grain size distribution of the sand is as follows:

11% greater than 250 microns,
23% within the range of 177-250 microns,
19% within the range of 149-177 microns,
36% within the range of 105-149 microns,
10% within the range of 74-105 microns, and
1% within the range of 44-74 microns.

In the experimental procedures, one volume amount of a 38°-42° API crude oil was added to a reaction vessel equipped with a mechanical stirrer. The stirrer was activated to initiate agitation while adding one to two volumes of the contaminated sand containing 25-30 weight percent oil as described above. Agitation was continued for several minutes and thereafter one to two volumes of warm water (typically about 44° C.) were added and the stirring was continued for several more minutes. Mechanical agitation was then terminated and the system was allowed to stand for about one hour to effect oil-water separation. The oil layer and the water layer were then removed and one unit volume of warm water was again added to the vessel and the mechanical stirrer activated for several minutes. Thereafter separation was allowed to continue for about 15 minutes and the water layer then withdrawn. In these experimental procedures the oil content of the sand was reduced significantly to values ranging from about 1 to 6 weight percent. Surprisingly enough it was found that the decontamination procedure was effective without the addition of surface active agents to the water. In fact, surface active agents were added to the water in several of the experimental procedures without a significant increase in decontamination efficiency.

Having described specific embodiments of the present invention, it will be understood that modifications thereof may be suggested to those skilled in the art, and it is intended to cover all such modifications as fall within the scope of the appended claims.

What is claimed is:

1. In a process for the treatment of production fluids from a well penetrating a subterranean oil reservoir to recover oil and clean sand from an oil contaminated sand, having steps comprising:
   (a) producing from said well a production fluid comprising crude oil having sand entrained therein;
   (b) separating said production fluid into a plurality of components, one of said components comprising an oil-contaminated sand;
   (c) contacting the oil-contaminated sand mixture with water; and
   (d) gravity separating said mixture into discrete sand, water, and oil phases the improvement comprising:
   (e) adding a light oil solvent to the oil contaminated sand prior to step (c).

2. The method of claim 1 wherein said sand is predominantly finer than 65 mesh.

3. The method of claim 1 wherein the water employed in step (d) is at a temperature of at least 40° C.

4. The method of claim 1 wherein the volume ratio of said solvent to said oil-contaminated sand is within the range of 0.5-1.0.

5. The method of claim 4 wherein the volume ratio of said water to said oil-contaminated sand is within the range of 1-2.

6. The method of claim 1 wherein said solvent contains a de-emulsifying agent.

7. The method of claim 1 further comprising the step of removing said oil and water phases from said sand phase and thereafter contacting said sand phase with water, agitating the resulting sand-water mixture, gravity separating said mixture into sand and water phases, withdrawing the water phase from the sand phase, and recovering the sand phase for disposal.

8. The method of claim 1 wherein a light oil solvent of step (e) is circulated down said well into admixture with oil from said formation.

9. The method of claim 8 wherein the light oil solvent circulated down the well contains a de-emulsifying agent.

10. The method of claim 8 wherein the solvent contacting the oil-contaminated sand and the solvent circulated down the well are unrefined oils.

11. The method of claim 10 wherein each of said unrefined oils contains a de-emulsifying agent.

* * * * *